United States Patent [19]

Friedman

[11] Patent Number: 4,528,165
[45] Date of Patent: Jul. 9, 1985

[54] SEPARATION OF URANIUM FROM TECHNETIUM IN RECOVERY OF SPENT NUCLEAR FUEL

[75] Inventor: Horace A. Friedman, Oak Ridge, Tenn.

[73] Assignee: The United States of America as represented by the United States Department of Energy, Washington, D.C.

[21] Appl. No.: 559,501

[22] Filed: Jun. 13, 1984

[51] Int. Cl.³ .................... C01G 43/00; C01G 57/00
[52] U.S. Cl. .......................................... 423/10; 423/2; 423/49
[58] Field of Search ................................ 423/2, 10, 49

[56] References Cited

U.S. PATENT DOCUMENTS

| | | | |
|---|---|---|---|
| 2,982,600 | 5/1961 | Vogler et al. | 423/10 |
| 3,104,940 | 9/1963 | Bril et al. | 423/10 |
| 4,092,265 | 5/1978 | Longo et al. | 423/2 X |
| 4,162,230 | 7/1979 | Horwitz et al. | 423/10 X |
| 4,162,231 | 7/1979 | Horwitz et al. | 423/2 X |
| 4,358,426 | 11/1982 | Tallent et al. | 423/10 |
| 4,443,413 | 4/1984 | Pruett et al. | 423/10 |

OTHER PUBLICATIONS

Campbell, M. H. "Extraction of Pertechnetate in a Purex Process", Hanford Atomic Products Operation, Richland, Washington, HW-69712, May 24, 1961.

Saraceno, A. J. "The Control of Technetium of the Portsmouth Gaseous Diffusion Plant", Goodyear Atomic Corp., Piketon, Ohio, GAT-2010, Nov. 1981.

Siddall, T. H., "Behavior of Technetium in the Purex Process", DuPont, At. En. Tech. Div., Savannah River Lab., M-3679, 22rd Ed., Rev. 1, Apr. 1959.

Primary Examiner—Teddy S. Gron
Assistant Examiner—Virginia B. Caress
Attorney, Agent, or Firm—Edwin D. Grant; Stephen D. Hamel; Judson R. Hightower

[57] ABSTRACT

A method for decontaminating uranium product from the Purex process comprises addition of hydrazine to the product uranyl nitrate stream from the Purex process, which contains hexavalent ($UO_2^{2+}$) uranium and heptavalent technetium ($TcO_4^-$). Technetium in the product stream is reduced and then complexed by the addition of oxalic acid ($H_2C_2O_4$), and the Tc-oxalate complex is readily separated from the uranium by solvent extraction with 30 vol. % tributyl phosphate in n-dodecane.

2 Claims, 1 Drawing Figure

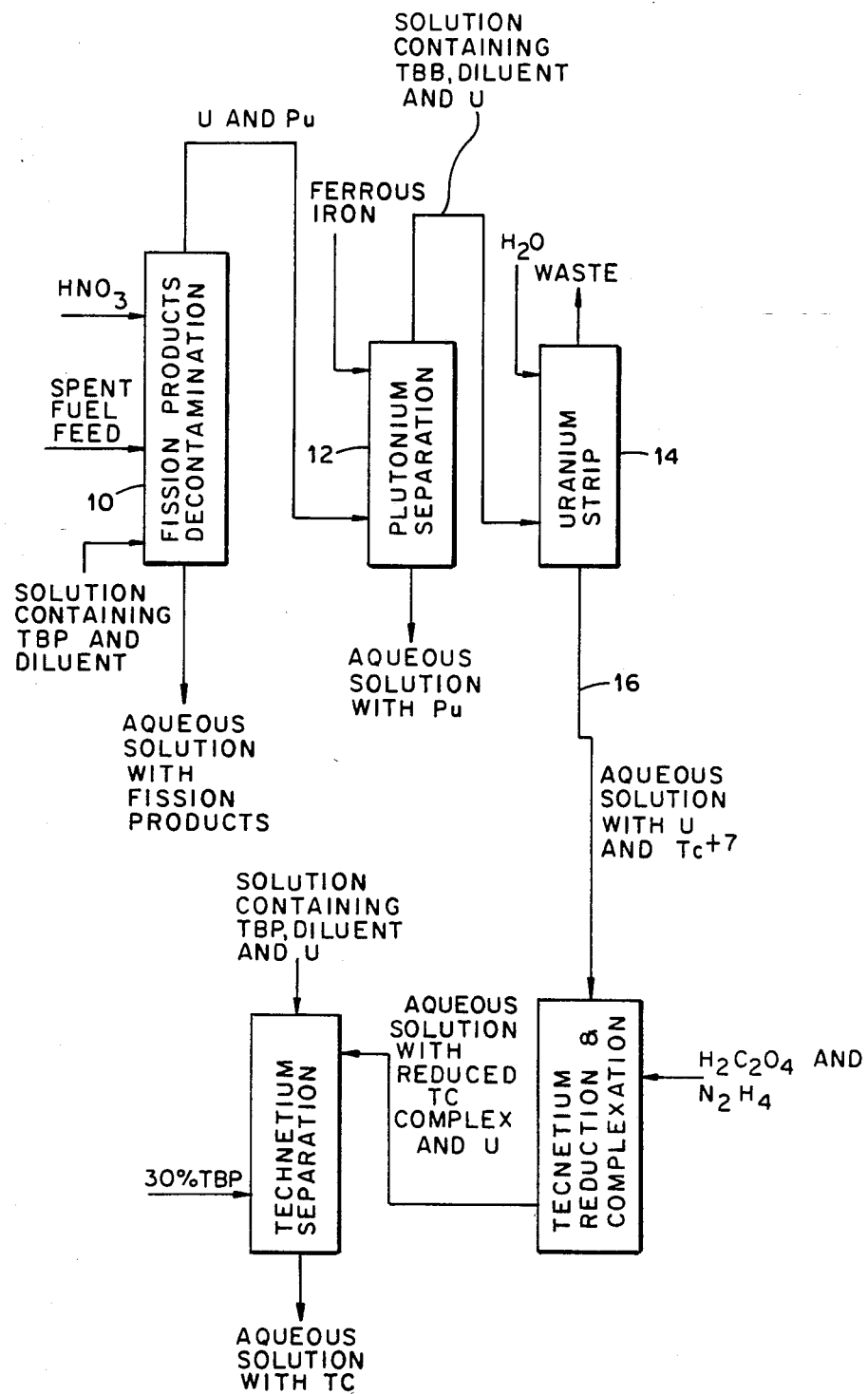

SEPARATION OF URANIUM FROM TECHNETIUM IN RECOVERY OF SPENT NUCLEAR FUEL

BACKGROUND OF THE INVENTION

The invention disclosed herein, which resulted from a contract with the U.S. Department of Energy, relates to an improved process for the recovery of spent nuclear fuel.

Spent nuclear fuel elements are processed to separate uranium, plutonium and fission products therein by a continuous, countercurrent solvent extraction operation commonly known as the Purex process. This process comprises the basic steps of (1) separation of fission products from U and Pu, (2) separation of U from Pu, and (3) further decontamination and concentration of U and Pu product streams. More specifically, U and Pu are extracted from a nitric acid solution (used to dissolve the spent fuel elements) into an organic phase containing tributyl phosphate (TBP) and an organic diluent such as dodecane, leaving most fission products in the aqueous phase. However, technetium is produce in large quantities in nuclear reactors, and whenever both $UO_2^{2+}$ and the pertechnetate ion ($TcO_4-$) are in the same solution, a complex containing both $UO_2^{2+}$ and $TcO_4-$ is formed which prevents separation of uranium from the technetium by the conventional steps of the Purex process.

When reprocessed U containing Tc is recycled to gaseous diffusion plants for enrichment, accumulation of Tc in process equipment causes various operational problems. Current methods for removing Tc from reprocessed U are employed only on the feed to gaseous diffusion plants and involve the sorption of gaseous technetium fluorides on solid traps. It would be more convenient to separate U and Tc in association with the chemical steps of the Purex process.

SUMMARY OF THE INVENTION

It is therefore an object of this invention to provide a chemical process for separating U and Tc which are contained in the product uranyl nitrate stream of the Purex process.

This object is achieved in accordance with the invention by contacting the product stream of the Purex process with hydrazine and oxalic acid to thereby convert $Tc^{+7}$ therein to a reduced Tc species and form an oxalate complex of said species, and then contacting the aqueous solution containing uranium and the complex of the reduced Tc species with an organic phase containing tributyl phosphate and an organic diluent to extract U from this aqueous solution into the organic phase while leaving substantially all of the reduced Tc species in the aqueous solution.

DESCRIPTION OF THE DRAWING

The accompanying drawing is a schematic representation of the Purex process and the associated method of separating U and Tc in the product stream thereof in accordance with the invention.

DETAILED DESCRIPTION OF THE INVENTION

In the drawing, the conventional steps of the Purex process are illustrated by flow streams associated with the columns designated 10, 12, 14. The produce stream from the Purex process is designated by reference number 16 in the flow diagram and typically comprises 0.01-0.10M nitric acid, 1.0M $UO_2(NO_3)_2$, and as much as 0.004M $TcO_4$.

In U.S. patent application Ser. No. 528,279, now U.S. Pat. No. 4,443,413, filed on Aug. 31, 1983 by D. J. Pruett and D. R. McTaggart and assigned to the U.S. Department of Energy, which is also the assignee of this application, a method is disclosed for separating technetium (Tc) from uranium (U) in the product uranyl nitrate [$UO_2(NO_3)_2$] stream from the Purex process. This method depends on the selective reduction of heptavalent Tc ($TcO_4-$) by the addition of the reducing agent hydrazine ($N_2H_4$) to the aqueous Purex product stream, and subsequent separation of reduced Tc from hexavalent U ($UO_2^{2+}$) by solvent extraction. It has been found, however, that under certain conditions occurring in the aqueous $UO_2(NO_3)_2$ stream, the hydrazine-reduced Tc species in the stream will not remain in solution and thus can not be separated quantitatively from $UO_2^{2+}$ by solvent extraction. The invention disclosed herein is an improvement of the process described in the aforesaid application of Pruett and McTaggart, and it is accomplished by adding a complexing agent, such as oxalic acid ($H_2C_2O_4$), and a reducing agent such as hydrazine to the aqueous $UO_2(NO_3)_2$ stream of the Purex process to thereby form a complex of the Tc reduced by the reducing agent, the Tc complex being retained in the aqueous $UO_2(NO_3)_2$ stream and thus being separable from uranium therein by subsequent solvent extraction. Preferably, hydrazine and oxalic acid are simultaneously added to the aqueous $UO_2(NO_3)_2$ stream, at a temperature of about 20°-25° C., to provide hydrazine and oxalic acid concentrations therein of about 0.01 to about 0.10M and about 0.03M, respectively. The $TcO_4-$ in the aqueous $UO_2(NO_3)_2$ stream is thereby reduced, and the reduced species is complexed by the action of the oxalic acid to a soluble Tc-oxalate complex that is separated from the $UO_2^{2+}$ by solvent extraction with an equal volume of 30 vol.% tributyl phosphate TBP in n-dodecane. The Tc is removed in the aqueous phase for recovery or disposal as waste, and the purified U product is water-stripped from the organic phase.

Under certain conditions, in the absence of a complexing agent the reduced Tc species does not remain dissolved in the aqueous $UO_2(NO_3)_2$ stream, as shown in Example I below.

EXAMPLE I

A solution containing 0.001M $KtcO_4$—0.01M $UO_2(NO_3)_2$—0.06M $N_2H_5.NO_3$—0.1N $HNO_3$ was photolyzed for 18 minutes with 254 nm radiation while being protected with a $N_2$ atmosphere (photolysis of the solution speeds up the rate of reduction of $Tc^{+7}$. The $TcO_4$ was completely reduced during the exposure (determined by absorption spectra). The solution was shaken with an equal quantity of 30% TBP-70% dodecane and chemical analysis performed on each layer. The results are shown below.

Aqueous layer Tc<20 micrograms/ml U 1.32 mg/ml (0.0055 m/l)

Organic layer Tc 0.04 micrograms/ml U 1.03 mg/ml (0.00433 m/l)

The reduced Tc species, formed by the reduction of $TcO_4-$, can be dissolved by the addition of the oxalic acid and then separated from the uranium as shown in Example II.

EXAMPLE II

A solution containing 0.001M $KTcO_4$—0.01M $UO_2(NO_3)_2$—0.06M $N_2H_5.NO_3$—0.1N $HNO_3$ was photolyzed for 18 minutes while being protected by a $N_2$ atmosphere. The $TcO_4-$ was completely reduced during the exposure as determined from the absorption spectrum. An aliquot of 1M oxalic acid was added to the solution, making the oxalate concentration 0.03M. After the Tc-oxalate complex formed, the acidity was raised to 1N. The solution was shaken with an equal quantity of 30% TBP-70% dodecane, and the chemical analysis performed on each solution. The results are shown below.

Aqueous layer: Tc 0.078 mg/ml (90% of theoretical) U 0.90 mg/ml (40%)

Organic layer: Tc<0.03 mg/ml (detection limit) U 1.36 mg/ml (60%)

Using these concentrations of reagents, it was found that a better procedure was to mix the oxalic acid with the other ingredients before reduction of $TcO_4-$ occurred. The Tc-oxalate species formed faster under these conditions than when the pertechnetate was reduced either by photolysis or dark reaction followed by the addition of the oxalic acid. The presence of the oxalic acid accelerated the dark reaction, but hampered the photochemical one. The results of this addition of oxalic acid before reduction can be seen in Example III.

EXAMPLE III

A solution containing 0.001M $KTcO_4$—0.01M $UO_2(NO_3)_2$—0.06M $N_2H_5.NO_3$—0.1N $HNO_3$—0.03M $H_2C_2O_4$ was mixed and protected from air by a $N_2$ atmosphere above the solution. After the formation of the Tc-oxalate, which was determined from absorption spectra (the formation of the Tc-oxalate complex was faster than in Example II), the acidity was raised to 1N and the solution then shaken with an equal quantity of 30% TBP-70% dodecane. Chemical analysis was performed on each solutions. The results are as shown below.

Aqueous layer: Tc 0.09 mg/ml (100% of theoretical) U 0.70 mg/ml (37%)

Organic layer: Tc<0.03 mg/ml (detection limit) U 1.17 mg/ml (63%)

From the preceding results, it can be seen that the technetium can be held in solution in the reduced form and separated from the uranium by the extraction procedure.

A number of reducing agents for $TcO_4-$ and complexing agents for the lower oxidation states of technetium are known, although the Tc-oxalate species in this disclosure has not been reported. Any reducing agent which would reduce the $TcO_4-$ to the proper oxidation state and not interfere with the rest of the process could be used, and any complexing agent could be used which would form a soluble complex with the reduced technetium and which would not interfere with the subsequent separation of the reduced Tc species from U by solvent extraction.

I claim:

1. In a spent nuclear fuel recovery process wherein a stream containing U and $Tc^{+7}$ is contacted with an organic phase containing tributyl phosphate and an organic diluent to extract U and $Tc^{+7}$ from said stream into said organic phase and subsequently U and $Tc^{+7}$ are stripped from said organic phase into an aqueous solution, the improvement comprising:

(1) contacting said aqueous solution with hydrazine and oxalic acid to thereby convert the $Tc^{+7}$ therein to a reduced Tc species and form a soluble oxalate complex of said reduced Tc species; and (2) contacting said aqueous solution containing U and the complex of the reduced Tc species with an organic phase containing tributyl phosphate and an organic diluent to extract U from said aqueous solution into said organic phase while leaving substantially all of the reduced Tc species in the aqueous solution.

2. The process of claim 1 wherein hydrazine and oxalic acid are added to said aqueous solution to provide a concentration of about 0.01 to about 0.10M hydrazine and about 0.03M oxalic acid therein.

* * * * *